United States Patent
Khoshkava et al.

(10) Patent No.: US 10,332,365 B2
(45) Date of Patent: *Jun. 25, 2019

(54) SMART MATERIAL FOR HAPTIC FEEDBACK

(71) Applicant: IMMERSION CORPORATION, San Jose, CA (US)

(72) Inventors: Vahid Khoshkava, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,474

(22) Filed: Jan. 23, 2018

(65) Prior Publication Data

US 2018/0158290 A1 Jun. 7, 2018

Related U.S. Application Data

(63) Continuation of application No. 15/291,132, filed on Oct. 12, 2016, now Pat. No. 9,911,292.

(51) Int. Cl.
| | |
|---|---|
| *G08B 6/00* | (2006.01) |
| *H02J 7/02* | (2016.01) |
| *G06F 3/01* | (2006.01) |
| *G09B 21/00* | (2006.01) |
| *B06B 1/04* | (2006.01) |
| *A41D 1/00* | (2018.01) |

(52) U.S. Cl.
CPC ............. *G08B 6/00* (2013.01); *B06B 1/045* (2013.01); *G06F 3/01* (2013.01); *G06F 3/016* (2013.01); *G09B 21/00* (2013.01); *H02J 7/02* (2013.01); *A41D 1/002* (2013.01)

(58) Field of Classification Search
CPC . G06F 3/01; G06F 3/016; G06F 3/141; G08B 6/00; G09B 21/00; G09B 21/003; H02J 7/02; H02J 7/025; H01L 21/48; H01L 21/50; H01L 21/56; H01L 21/565
See application file for complete search history.

(56) References Cited

U.S. PATENT DOCUMENTS

| | | | |
|---|---|---|---|
| 4,517,514 A | * 5/1985 | Howell | G01D 5/2033 324/207.15 |
| 6,982,696 B1 | 1/2006 | Shahoian | |
| 8,362,882 B2 | 1/2013 | Heubel et al. | |
| 8,665,241 B2 | 3/2014 | Heubel et al. | |

(Continued)

FOREIGN PATENT DOCUMENTS

| | | |
|---|---|---|
| EP | 3026528 | 6/2016 |
| WO | 2016147171 | 9/2016 |

OTHER PUBLICATIONS

Bellan and Bossis, "Field Dependence of Viscoelastic Properties of MR Elastomers," Int. J. Mod. Phys. B. 16:2447-2453 (2002).

(Continued)

*Primary Examiner* — Van T Trieu
(74) *Attorney, Agent, or Firm* — Medler Ferro Woodhouse & Mills PLLC (57) ABSTRACT

This disclosure relates to haptic actuators, and suitably haptic actuators based on repulsion and attraction between a coil and a magnet. Such haptic actuators are useful in structural materials, such as elements of wearables or accessories.

20 Claims, 6 Drawing Sheets

(56) References Cited

U.S. PATENT DOCUMENTS

| | | | |
|---|---|---|---|
| 9,058,728 | B2 | 6/2015 | Fantauzza |
| 9,911,292 | B1 * | 3/2018 | Khoshkava ............... H02J 7/02 |
| 2004/0249428 | A1 | 12/2004 | Wang |
| 2011/0197333 | A1 | 8/2011 | Liotta |
| 2015/0156581 | A1 | 6/2015 | Efrati |
| 2015/0219078 | A1 | 8/2015 | Li |

OTHER PUBLICATIONS

Palleau, et al., "Reversible patterning and actuation of hydrogels by electrically assisted ionoprinting," Nature Communications 4:2257 (2013).

Behl and Lendlein, "Shape Memory Polymers," MaterialsToday, vol. 10, pp. 20-28 (2007).

* cited by examiner

001
SMART MATERIAL FOR HAPTIC FEEDBACK

CROSS-REFERENCE TO RELATED APPLICATIONS

The present application is as continuation of U.S. application Ser. No. 15/291,132, filed Oct. 12, 2016, now U.S. Pat. No. 9,911,292, the disclosure of which is incorporated by reference herein in its entirety.

TECHNICAL FIELD

This disclosure relates to haptic actuators, and suitably haptic actuation resulting from repulsion and attraction between a coil and a magnet. Such haptic actuators are useful in structural materials, including as elements of wearables or accessories.

BACKGROUND

Haptic feedback for use in wearables or accessories has traditionally been based on the use of eccentric rotating mass (ERM) motors and linear resonant actuators (LRA). However, these types of actuators are typically bulky and often require large amounts of power, making them difficult to integrate into clothing or other wearables or accessories (i.e., jewelry, etc.). Shape memory alloys have also been used in wearables, but again, power consumption often limits their applicability and ease of integration.

What is needed is a simple mechanism for providing haptic feedback to a user that can readily be implemented in wearable and accessory goods.

SUMMARY

This disclosure relates to smart materials comprising a coil and a magnet for providing haptic feedback to a user, wherein the smart material for providing haptic feedback may be used in various applications, such as wearables and accessory goods.

In exemplary embodiments, provided herein are smart materials for providing haptic feedback to a user. Suitably, such smart materials for providing haptic feedback to a user comprise a structural material, a coil associated with the structural material, and a magnet associated with the structural material. Suitably, the coil and the magnet are oriented in an opposed manner to each other so as to provide the haptic feedback to the user.

Also provided herein are smart materials for providing haptic feedback to a user, comprising a structural material, a copper coil associated with the structural material, a power supply connected to the copper coil, and a magnet associated with the structural material. In embodiments, the copper coil and the magnet are oriented in an opposed manner to each other so as to provide the haptic feedback to the user.

Also provided are methods for providing haptic feedback to a user via a smart material, the smart material comprising a structural material, a coil associated with the structural material, a power supply connected to the coil, and a magnet associated with the structural material. Suitably, the coil and the magnet are oriented in an opposed manner to each other. The methods suitably comprise transmitting an activating signal to the power supply, and generating a haptic feedback between the coil and the magnet, resulting in actuation of the structural material and providing the haptic feedback to the user.

In further embodiments, provided herein are smart materials for providing haptic feedback to a user, which include a structural material, a first actuator associated with the structural material, and a second actuator associated with the structural material, wherein the first actuator and the second actuator are oriented in an opposed manner to each other so as to provide the haptic feedback to the user.

BRIEF DESCRIPTION OF THE DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Various embodiments will be described in detail, some with reference to the drawings. Reference to various embodiments does not limit the scope of the claims attached hereto. Additionally, any embodiments set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In embodiments, provided herein are smart materials for providing haptic feedback to a user, which include a structural material.

As used herein "smart material(s)" refers to a material that is capable of being controlled such that the response and properties of the material change under the influence of an external stimulus.

As used herein "haptic feedback" or "haptic feedback signal" refer to information such as vibration, texture, and/or heat, etc., that are transferred, via the sense of touch, from a structural material as described herein, to a user.

As used herein, "structural material" means a material used in constructing a wearable, personal accessory, luggage, etc. Examples of structural materials include: fabrics and textiles, such as cotton, silk, wool, nylon, rayon, synthetics, flannel, linen, polyester, woven or blends of such fabrics, etc.; leather; suede; pliable metallic such as foil; Kevlar, etc. Examples of wearables include: clothing; footwear; prosthetics such as artificial limbs; headwear such as hats and helmets; athletic equipment worn on the body; protective equipment such as ballistic vests, helmets, and other body armor. Personal accessories include eyeglasses; neckties and scarfs; belts and suspenders; jewelry such as bracelets, necklaces, and watches (including watch bands and straps); wallets, billfolds, luggage tags, etc. Luggage includes handbags, purses, travel bags, suitcases, backpacks, including handles for such articles, etc.

Figure 1A:
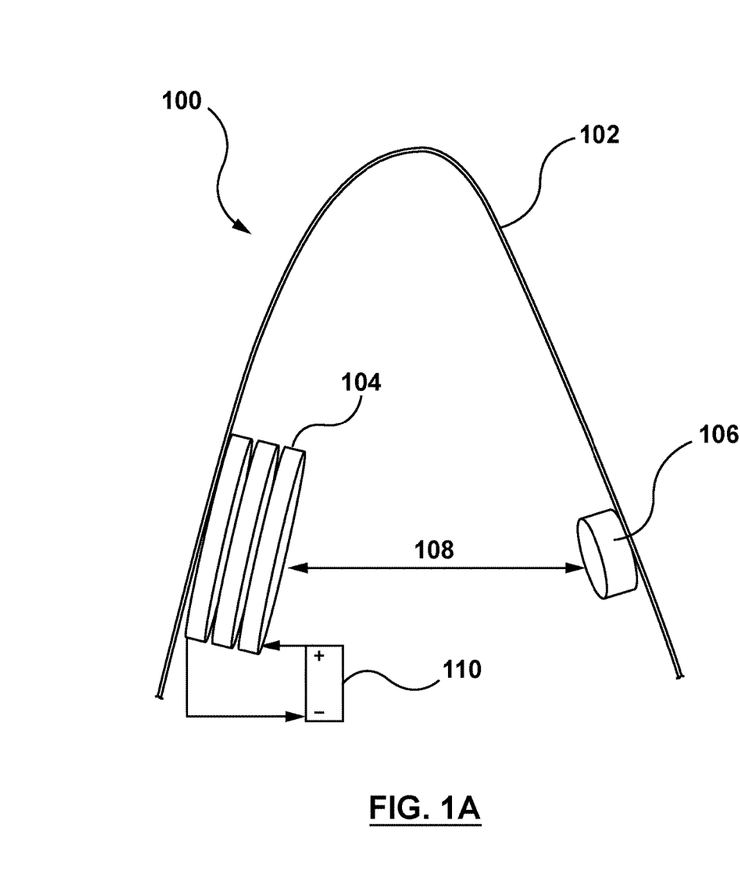
FIG. 1A—shows a smart material for providing haptic feedback in accordance with an embodiment hereof.
Figure 1B:
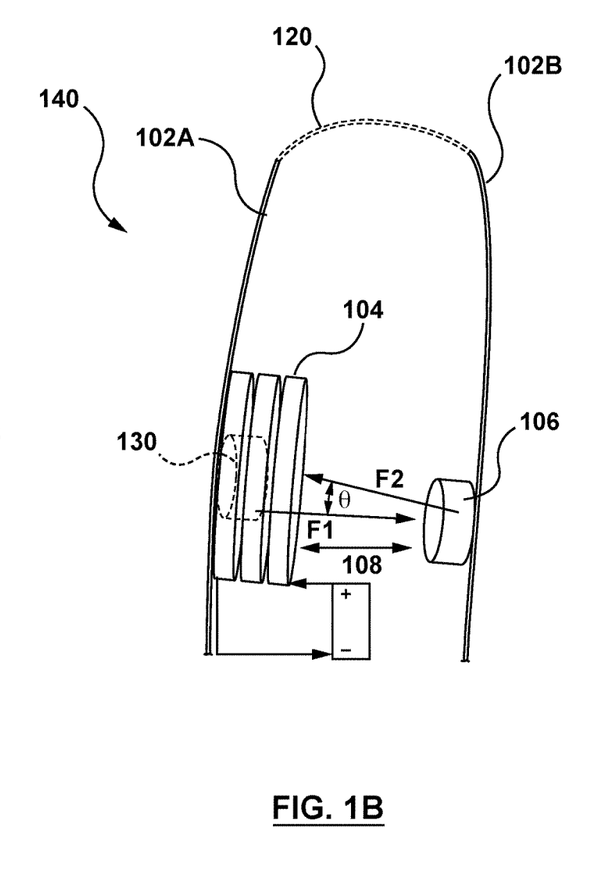
FIG. 1B shows a further smart material for providing haptic feedback in accordance with an embodiment hereof.

FIGS. 1A-1B show exemplary embodiments of smart materials (100 and 140) for providing haptic feedback to a user. Suitably, the smart material for providing haptic feedback includes a structural material 102, a coil 104 associated with structural material 102, and a magnet 106 associated with structural material 102.

In embodiments, in smart materials (e.g., 100 and 140) for providing haptic feedback as described herein, coil 104 and magnet 106 are oriented in an opposed manner 108 to each other so as to provide the haptic feedback to the user. An "opposed manner" as used herein refers to the magnetic field of coil 104, F1, and magnetic field of magnet 106, F2, being oriented so as to be substantially diametrically opposed to each other (see FIG. 1B). As used herein, magnetic field of coil 104 and magnetic field of magnet 106, refer to the direction of the magnetic field lines from an electromagnetic coil (e.g., coil 104) and from a magnet (e.g., magnet 106). Magnetic field F1 and magnetic field F2 are substantially diametrically opposed to each other, meaning that they oppose each other in such a way that an angle between the direction of the respective magnetic field lines is less than about 10 degrees (see angle θ in FIG. 1B). Suitably, the angle between F1 and F2 is less than about 9 degrees, less than about 8 degrees, less than about 7 degrees, less than about 6 degrees, less than about 5 degrees, less than about 4 degrees, less than about 3 degrees, less than about 2 degrees, or less than about 1 degree.

Coil 104 is suitably an electromagnetic coil, for example, a coil of a conductive fiber, such as a wire, including for example a copper coil. Coil 104 is suitably an air coil, which refers to a winding of conductive material around a non-magnetic center, including an air center. Electromagnetic coils are known in the art to refer to electrical conductors made in the shape of a coil, spiral or helix, which generate a magnetic field as the result of a current passing through the coil.

Coil 104 can comprise any suitable conductive material, and in embodiments, comprises a wire of a conductive material. Examples of conductive materials include metals (such as aluminum, copper, gold and chromium), transparent conducting oxides ("TCO," such as tin-doped indium oxide ("ITO") and aluminum-doped zinc oxide ("AZO")), transparent carbon nanotubes (CNTs), transparent conducting polymers (such as Poly(3,4-ethylenedioxythiophene) ("PEDOT"), Poly(3,4-ethylenedioxythiophene):poly(styrene sulfonate) ("PEDOT:PSS") and Poly(4,4-dioctylcyclopentadithiophene)). Additionally, coil 104 can be formed with conductive nanoparticles or nanowires, and can have any suitable nano-shapes or geometries. Other embodiments of the coil can have a scale other than a nano-scale.

In exemplary embodiments, coil 104 can be planar in structure (i.e., substantially flat), or can have a thickness, generally on the order of a few 100 microns to millimeters to a few centimeters. In embodiments, coil 104 can be formed by a conductive wire in a planar spiral pattern with each winding having a progressively larger distance from the center portion of coil 104 than a prior winding.

Coil 104 can be formed by any suitable method. For example, a masking technique may be used, where a mask is applied to a substrate to expose the areas where a conductive material is to be deposited but the remaining areas are covered. Masking can be accomplished using an adhesive tape or a developed photoresist, or any other suitable method. A layer of conductive material is then deposited on the masked substrate by chemical/physical vapor deposition or any other suitable technique. The thickness of the deposited metal can range from nanometer to micrometer scale or greater based on a magnitude of an electrical current to be used in a specific application. In another example, a conductive film can be deposited on the substrate. Portions of the film can be subsequently removed by, for example, selective etching with photolithographic techniques well known in the microelectronic industry, leaving behind the desired coil. In a further example, coils 104 can be printed on to a substrate using 3-dimensional printing ("3-D printing") techniques. In additional embodiments, coils 104 can be simply prepared by winding or turning a conductive material (e.g., wire) into the desired shape, configuration and size.

In additional embodiments, instead of coil 104 including only a coiled wire, for example, the coil can instead comprise a coil magnet 130 inside of the coil (see FIG. 1B, coil magnet 130 shown as hidden). Coil magnet 130, in response to changes in the current passing through coil 104, changes its polarity, resulting in a magnetic field that will oppose that of magnet 106.

In embodiments, magnet 106 is suitably a permanent magnet having a set polarity. Though in other embodiments, a second coil connected to a power supply can be used to generate a magnetic field as described herein, to act as magnet 106. Exemplary materials for magnet 106 include iron, nickel, cobalt, alloys of rare earth metals, and naturally occurring minerals such as lodestone.

In further embodiments, magnet 106 can comprise magnetic particles, including micro- or nanomagnetic materials. For example, magnet 106 can comprise a matrix of a polymeric material with magnetic particles embedded in it. The polymeric material can be chosen from those described herein, including for example, soft polymeric materials, such as silicone, natural rubber and synthetic rubber, or a rigid material, such as polyethylene terephthalate (PET), polycarbonate (PC) polyethylene naphthalene (PEN), silicon based polymers, polyurethanes, thermoplastics, thermoplastic-elastomer, thermoset, and polymer composites filled with natural or synthetic fillers. The magnetic particles can be nanoparticles of magnetic materials such as carbon iron nanoparticles or rare-earth (e.g., neodymium) nanoparticles.

In exemplary embodiments, magnet 106 can be prepared by dissolving a polymeric matrix in an appropriate solvent. Magnetic particles, such as magnetic nanoparticles, can then be added into the solution. If necessary the magnetic particles can be stabilized to prevent them from coagulating. For example, certain molecules can be attached, or tethered, to the magnetic particle surfaces to overcome the attractive forces between magnetic particles. The solvent can then be dried to maintain the magnetic particles in their positions.

For a non-soluble polymeric material, such as polypropylene and polyethylene, a melt mixing technique can be used to prepare magnet 106. In the melt mixing, a polymer is first added to a mixing chamber and heated up to its melting temperature. The polymer melt behaves like a liquid. Then, magnetic particles are added to the melt at high temperatures. The polymer melt, with the dispersed magnetic particles, can later be molded to any desired shape using hot press equipment.

As described herein, coil 104 is suitably connected to power supply 110. Upon providing power to coil 104, a magnetic field is generated either via coil 104, or via coil magnet 130 inside of coil 104. This magnetic field, F1, is oriented in an opposed manner 108 to magnet 106, so that field F1 and field F2 are substantially diametrically opposed to one another, resulting in the repulsion and/or attraction of coil 104 and magnet 106, causing structural material 102 to move. This movement of structural material 102 provides the haptic feedback to a user who feels the structural material move an initial distance and return, or vibrate/oscillate, depending on the configuration and desired power initiated by the signal being sent to coil 104.

In embodiments shown for example in FIG. 1A, coil 104 and magnet 106 can be on a single piece of structural material 102. Structural material 102 in such an embodiment is a single, continuous piece that includes both coil 104 and magnet 106, including for example, a single piece of fabric, textile, etc.

As shown in FIG. 1B, in further embodiments, coil 104 and magnet 106 can be on separate pieces of structural material, e.g., structural material piece 102A and structural material piece 102B, that are not attached and are completely separate from one another. In further embodiments, coil 104 and magnet 106 can be on attached pieces of structural material e.g., 102A and 102B attached via attachment 120. Attachment 120 can be a seam, stitch, glue, adhesive, additional piece of material (e.g., fabric, tape, etc.), or other structure that allows structural material pieces 102A and 102B to be attached together or otherwise joined.

Figure 2A:
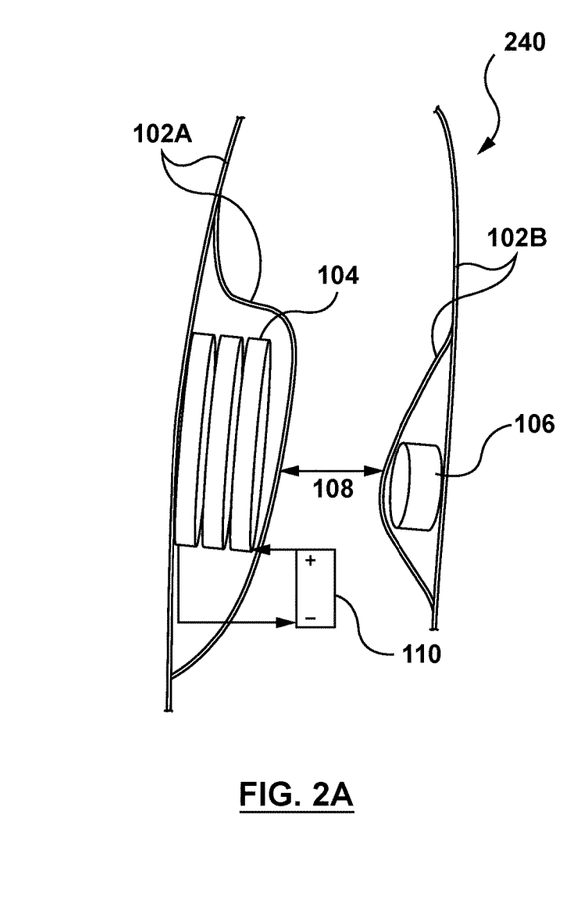
FIG. 2A shows a still further smart material for providing haptic feedback in accordance with an embodiment hereof.

Various mechanisms for attaching coil 104 and magnet 106 to structural material 102 can be used. For example, coil 104 and magnet 106 can be integrated into structural material 102. Coil 104 and/or magnet 106 can be made part of structural material 102 during formation of structural material 102, such as during weaving or sewing of a textile, etc. For example as shown in FIG. 2A, coil 104 can be integrated into structural material piece 102A, while magnet 106 can be integrated into structural material piece 102B, so as to form smart material 240.

In additional embodiments, coil 104 and/or magnet 106 can be fixedly attached to structural material 102. In such embodiments, coil 104 and/or magnet 106 can be glued, taped, stitched, adhered, stapled, tacked, or otherwise attached to structural material 102. Coil 104 and magnet 106 can also be integrated into, or on, various substrates, e.g., polymers such as rubbers, silicones, silicone elastomers, Teflon, plastic poly(ethylene terephthalate), etc., in the form of patches, ribbons or tapes that can then be attached to structural material 102 (e.g., adhered or sewn).

Figures 2B, 2C:
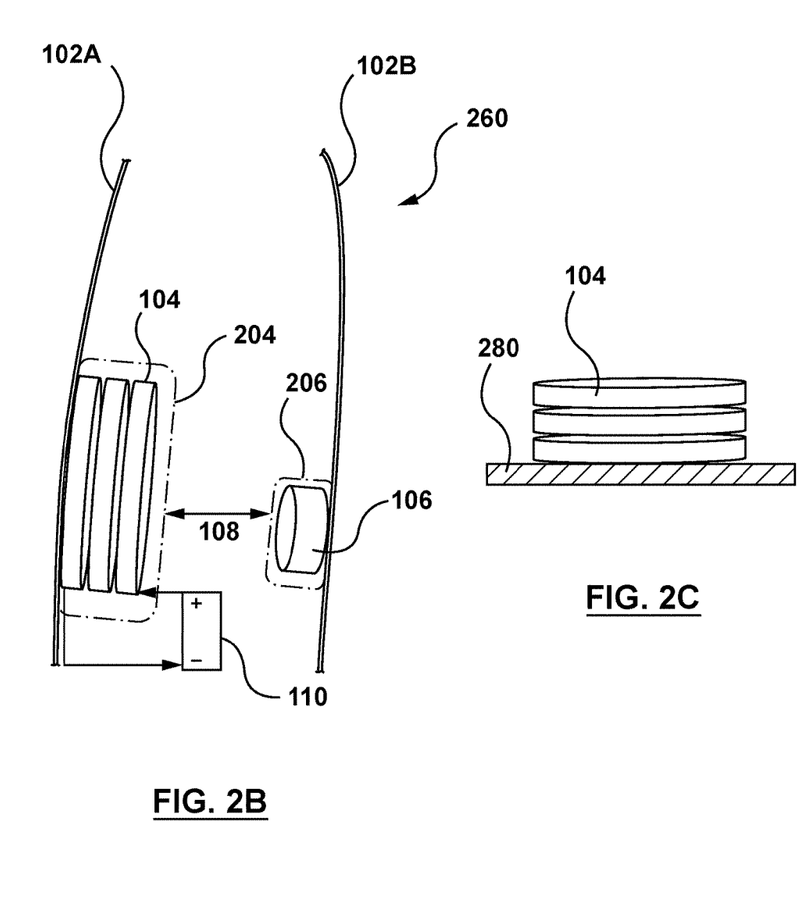
FIG. 2B shows an additional smart material for providing haptic feedback in accordance with an embodiment hereof.
FIG. 2C shows a magnetic coil integrated onto a substrate.

In additional embodiments, coil 104 and/or magnet 106 can be enclosed in an encapsulating material, e.g., encapsulating material 204 and/or encapsulating material 206, as shown in smart material 260 FIG. 2B. Suitably, encapsulating material (204 and/or 206) comprises a water-resistant material or polymer, allowing for coil 104 and/or magnet 106 to come into contact with water, such as during washing of a wearable, or during wearing of a wearable article where water may be present. Exemplary materials for use as encapsulating material 204 and/or 206 include various polymers, such as rubbers, silicones, silicone elastomers, Teflon, plastic poly(ethylene terephthalate), etc.

In embodiments such as smart material 260 as shown in FIG. 2B, or in smart material 140 of FIG. 1B, coil 104 and magnet 106 may be removably attached to a structural material to be easily removed and used on more than one structural material, for example, transferring from one wearable article to another.

As described herein, suitably structural material 102 further comprises power supply 110 connected to coil 104 (i.e., an electrical connection or wireless power connection). In embodiments, power supply 110 can be permanently connected to coil 104, or in other embodiments can be separated from coil 102 and later connected. Power supply 110 can come as an integrated component along with coil 102, or can be provided separately, or later provided, to supply power to coil 104. The amount of power provided by power supply 110 is suitably on the order of about 0.1 Watts (W) to about 10 W, or more suitably about 0.5 W to about 5 W, or about 1 W to about 5 W, or about 0.5 W, about 1 W, about 2 W, about 3 W, about 4 W or about 5 W.

In still further embodiments, provided herein are smart materials for providing haptic feedback to a user, comprising structural material 102, coil 104 (suitably a copper coil associated with the structural material 102), power supply 110 connected to coil 104, and magnet 106 associated with the structural material, wherein coil 104 and magnet 106 are oriented in an opposed manner 108 to each other so as to provide the haptic feedback to the user. As described herein, suitably coil 104 and magnet 106 are oriented so that the magnetic field of coil 104 and the magnetic field of magnet 106 are substantially diametrically opposed.

Exemplary magnetic materials are described herein, as are suitable orientations for coil 104 and magnet 106 with regard to structural material 102.

In further embodiments, coil 102 and/or magnet 106 can be provided as part of a rigid or flexible substrate or base 280 (see FIG. 2C) for integration into, or attachment to, a structural material. For example, a substrate can be made of a soft polymeric material, such as silicone, natural rubber and synthetic rubber, or a rigid material, such as polyethylene terephthalate (PET), polycarbonate (PC) and polyethylene naphthalene (PEN). The substrate can be of any thickness suitable for specific application. For example, the substrate can have a thickness ranging from 50 micrometers to 2.0 millimeters, from 100 micrometers to 1.0 millimeters, or from 300 micrometers to 0.70 millimeters. It is noted that a substrate in accordance with embodiments hereof can be flexible if it is sufficiently thin, even though the material it is made of may be characterized as "rigid." Depending on the application, a transparent or an opaque material can be used for the substrate. The substrate can be made to have other properties suitable for specific applications and/or environment. For example, a high temperature-resistant material, such as Zytel® long chain polyamides (LCPA), can be used as a substrate of a coil if the coil is expected to generate heat or placed in a high-temperature environment.

Figure 3A:
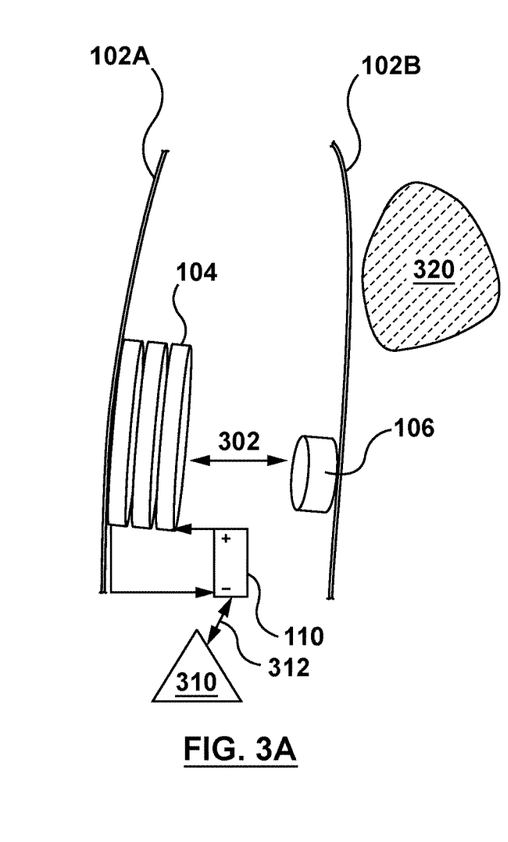
FIGS. 3A-3C show a method for providing haptic feedback to a user via a structural material in accordance with an embodiment hereof.
Figure 3B:
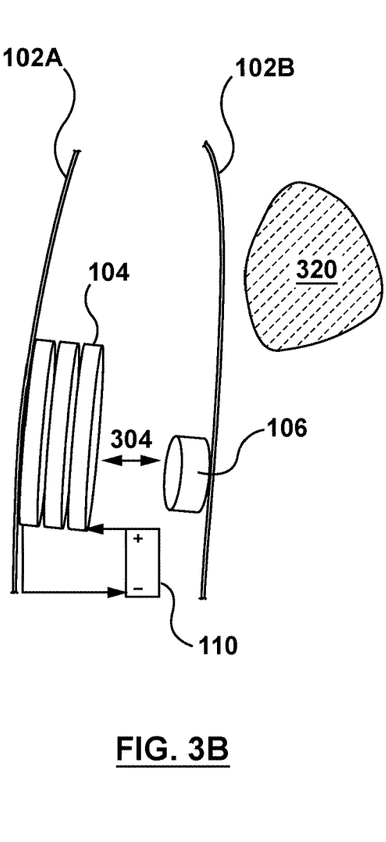
Figure 3C:
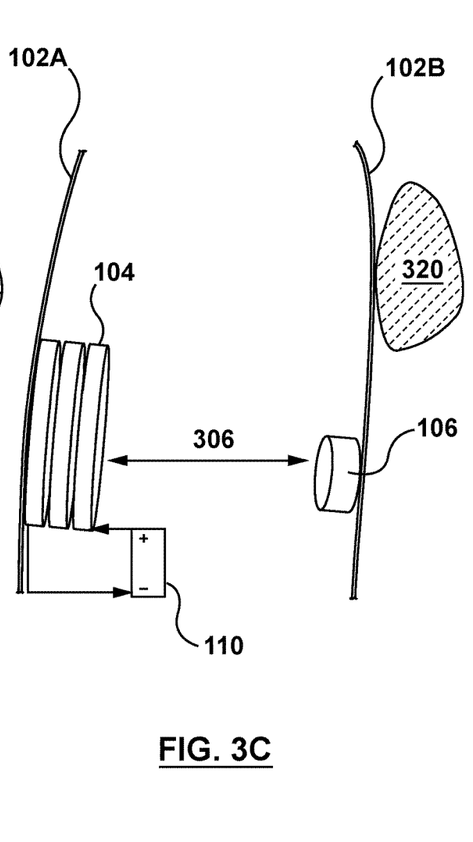

Also provided herein are methods for providing haptic feedback to a user via a structural material. As shown in FIGS. 3A-3C, a smart material 100 for providing haptic feedback to a user 320, suitably comprises a structural material (e.g., structural material pieces 102A and 102B), coil 104 associated with the structural material, power supply 110 connected to the coil, and magnet 106 associated with the structural material. As described throughout, coil 104 and magnet 106 are oriented in an opposed manner to each other, such that the magnetic field of each is substantially diametrically opposed.

Suitably, the method comprises transmitting an activating signal 312 to power supply 110 and generating movement between coil 104 and magnet 106, resulting in actuation of the structural material and the generation of haptic feedback to the user. Suitably activating signal 312 is provided by a controller 310 (shown only in FIG. 3A for illustrative purposes, but suitably present in any of the various configurations provided herein).

In embodiments, for example as in FIG. 3B, structural material pieces 102A and 102B begin at an initial position, with suitably some separation between coil 104 and magnet 106, e.g., position 304. However, in other embodiments, coil 102 and magnet 106 can be touching. Upon transmission of activating signal 312, power supply 110 provides power to coil 104, resulting in the generation of an electromagnetic field. This electric field cases movement between coil 104 and magnet 106, as for example, coil 104 and magnet 106 have opposite magnetic charges, resulting in a repulsion, moving or driving the structural material pieces away from one another, for example as in FIG. 3C, to position 306. In exemplary embodiments, the movement between the coil 104 and the permanent magnet 106 results in actuation of structural material pieces 102A and 102B and thereby provides haptic feedback to user 320, for example, in the form of a touch or impact to user 320. User 320 is illustrated for exemplary purposes only, and suitably can be any part of a user, including finger, head, arms, legs, trunk, etc.

In other embodiments, haptic feedback to user 320 can result from structural material piece 102A or 102B moving away from user 320, which can be sensed by user 320 as a loss of contact, or movement of a piece of a wearable, for example, away from the body of user 320.

In embodiments movement created between coil 104 and magnet 106 may switch between attraction and repulsion between coil 104 and the magnet 106 so as to generate an oscillation or vibration that may be felt as haptic feedback by a user. For example, the oscillation can begin with coil 104 and magnet 106 in a close proximity, for example, position 302 as shown in FIG. 3A. The oscillation can then progress, for example, to a closer proximity, for example, position 304 (FIG. 3B), before moving farther apart, for example as in position 306 (FIG. 3C). The oscillation can also begin at any position of 302, 304 or 306 (or position between these positions), and progress in any suitable manner to generate a suitable haptic feedback.

In embodiments, the haptic feedback generated by coil 104 and magnet 106 can occur as a single instance, for example, a single movement, either repulsion or attraction therebetween, for each activating signal 312. In other embodiments, the haptic feedback may be generated by multiple oscillations (each oscillation being a cycle of attraction and repulsion) (i.e., 2, 5, 10, 20, 50, 100 oscillations, etc.) for a single activating signal 312. In embodiments, the oscillating occurs at a frequency of less than about 10 Hz, including at a frequency of about 1 Hz. In other embodiments, the oscillation can occur at a higher frequency, for example about 1 Hz to about 100 kHz, suitably about 10 Hz to about 100 Hz, providing a vibrational haptic feedback to user 320.

The oscillation of coil 104 and magnet 106 can result from generating power in coil 104 which creates a magnetic field to repel magnet 106. The power can then be turned off, allowing magnet 106 to return to an initial or equilibrium position, before being turned on again and re-instating the repulsion. In other embodiments, the power can be oscillated (i.e., as an alternating current), causing switching of a magnetic field at coil 104, resulting in repulsion followed by attraction to cause the oscillation or vibration of structural material 102 and the haptic feedback to user 320.

As described throughout, in the methods of providing haptic feedback to a user, coil 102 and magnet 106 can be located on a single piece of structural material 102, can be located on attached pieces of the structural material (102A and 102B), or can be located on separate pieces of structural material (102A and 102B).

As described herein, instead of a combination of coil 104 and opposing magnet 106 (e.g., a permanent magnet), two coils can also be used resulting in electromagnets opposing each other. When both coils are energized, for example, they can attract or repel each other, and become closer or farther apart from one and other.

The acceleration that occurs between coil 104 and magnet 106, suitably is on the order of about 2 g (where g is the gravitational acceleration at the Earth's surface and is nominally 9.8 m/s$^2$) and depends on the strength and the shape of the applied current, characteristics of coil 104 and magnet 106 (e.g., concentration of the magnetic particles), and the space between coil 104 and magnet 106.

Figure 6:
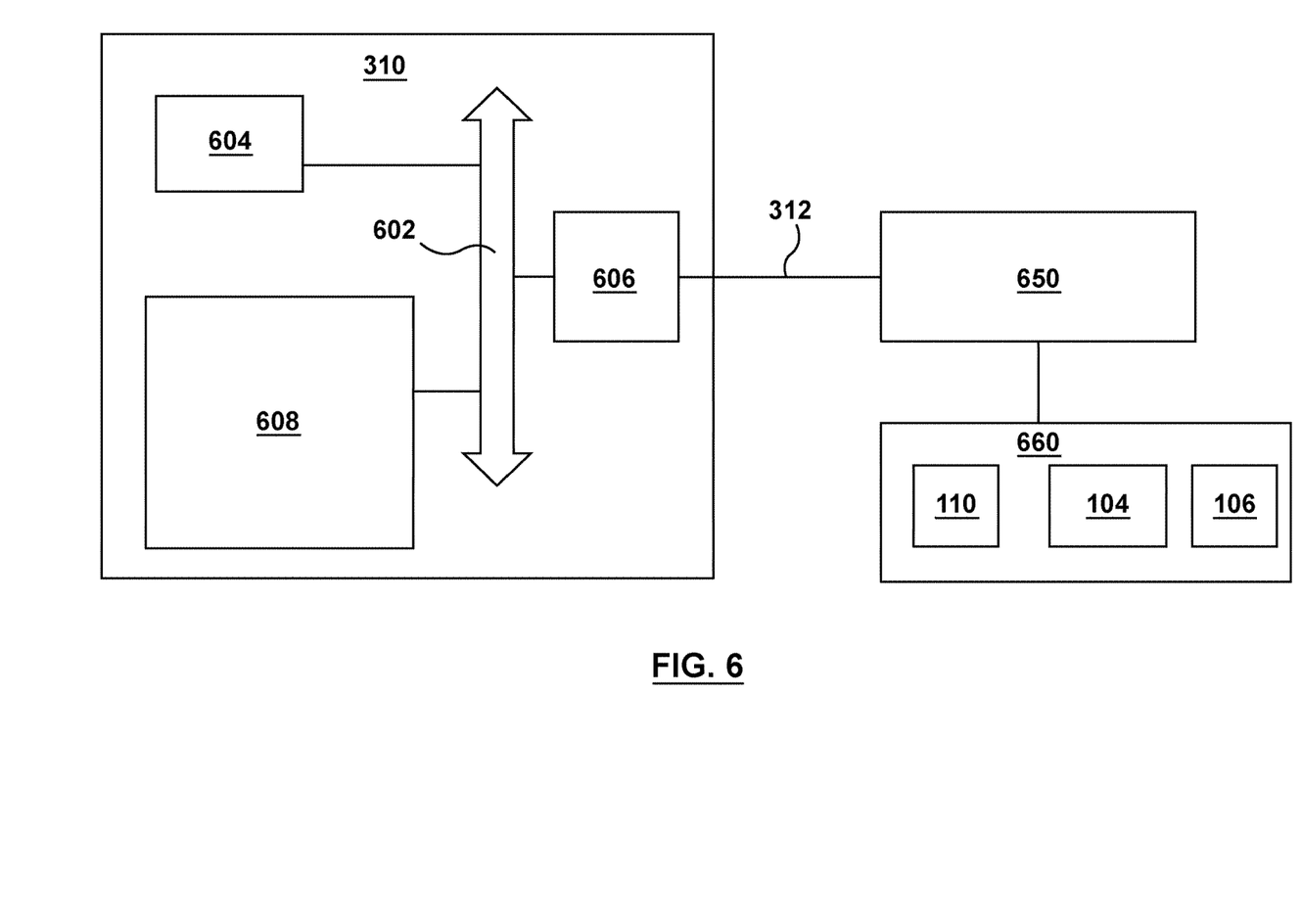
FIG. 6 shows exemplary block diagram of a control system for haptic feedback in accordance with an embodiment hereof.

Exemplary elements of controller 310 are well known in the art, and suitably include a bus 602, a processor 604, an input/output (I/O) controller 606 and a memory 608, for example, as shown in FIG. 6, representing an exemplary block diagram of a control system for haptic feedback as described herein. Bus 602 couples the various components of controller 310, including the I/O controller 606 and memory 608, to the processor 604. Bus 602 typically comprises a control bus, address bus, and data bus. However, bus 602 can be any bus or combination of busses suitable to transfer data between components in controller 310.

Processor 604 can comprise any circuit configured to process information and can include any suitable analog or digital circuit. Processor 604 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, processor 604 can comprise a single unit, or a combination of two or more units, with the units physically located in a single controller or in separate devices.

I/O controller 606 comprises circuitry that monitors the operation of controller 310 and peripheral or external devices. I/O controller 606 also manages data flow between the controller 310 and peripherals or external devices. Examples of peripheral or external devices with which I/O controller 606 can interface include switches, sensors, external storage devices, monitors, input devices such as keyboards, mice or pushbuttons, external computing devices, mobile devices, and transmitters/receivers.

Memory 608 can comprise volatile memory such as random access memory (RAM), read only memory (ROM), electrically erasable programmable read only memory (EEPROM), flash memory, magnetic memory, optical memory or any other suitable memory technology. Memory 608 can also comprise a combination of volatile and nonvolatile memory.

Memory 608 is configured to store a number of program modules for execution by processor 604. The modules can, for example, include an event detection module, an effect determination module, and an effect control module. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with controller 301.

In embodiments described herein, controller 310, which can include a wireless transceiver (including a Bluetooth or infrared transceiver), can be integrated into structural material 102, integrated with coil 104, or can be separately attached to coil 104. In further embodiments, controller 310 can be on a separate device from both structural material 102, coil 104 and magnet 106, but is suitably connected via a wired or more suitably a wireless signal, so as to provide activating signal 312 to the various components of the systems and smart materials described herein.

For example, as shown in FIG. 6, controller 310 can provide activating signal 312 to actuator drive circuit 650, which in turn communicates with one or more of power supply 110, coil 104 and/or magnet 106, of the smart materials described herein, so as to provide haptic feedback to a user of a smart material or system as described herein. For example, desired haptic feedback can occur, for example, when a mobile phone or other device to which controller 310 is paired via wireless connection receives a message or email. Additional examples include controller 310 being associated with devices such as game controllers, systems or consoles, computers, tablets, car or truck interfaces or computers, automated payment machines or kiosks, various keypad devices, televisions, various machinery, etc. In such embodiments, controller 310 suitably provides activating signal 312 to actuator drive circuit 650, to provide haptic feedback to a user in response to a signal originated by or from an external device. The device can also be a part of the wearable on which the various components of the haptic feedback systems described herein are contained. Exemplary feedback or signals that can be provided by a device, include, for example, indications of incoming messages or communication from a third party, warning signals, gaming interaction, driver awareness signals, computer prompts, etc.

In further embodiments, the smart materials and components described herein can be integrated with or be part of a virtual reality or augmented reality system. In such embodiments, the smart materials can provide haptic feedback to a user as he or she interacts with a virtual or augmented reality system, providing responses or feedback initiated by the virtual reality or augmented reality components and devices.

As described herein, suitably structural material 102 (or structural material pieces 102A and 102B) are incorporated into wearable articles, such as, wearables textiles, including shirts, blouses, hats, jackets, coats and pants/shorts. The structural materials can also be integrated into accessories, including various leather goods, including wallets and purses, handbags (including handles of such), backpacks, as well as jewelry, etc. In further embodiments, the structural materials can be integrated into various gaming peripherals, such as gamepads or controllers, etc. The structural materials are suitably integrated where two elements are able to move relative to each other, including such parts as cuffs, collars, pocket and shirt, tie and shirt, buttoned plackets, as well as handles for bags and purses, sections of watch bands, wallet folds, parts of hats, etc.

Figure 4A:
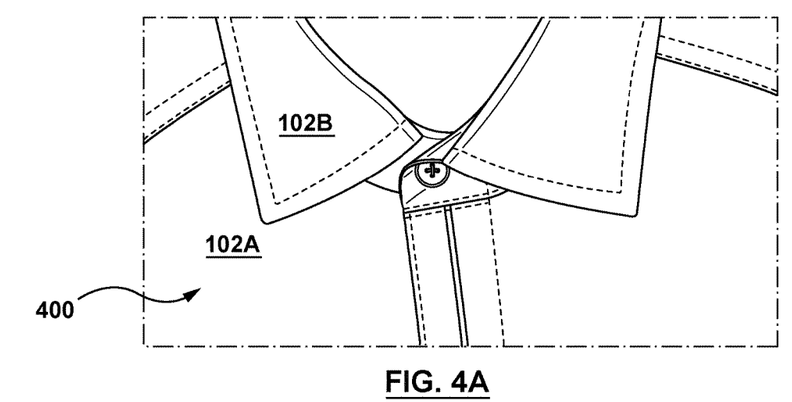
FIGS. 4A-4B show a wearable for providing haptic feedback in accordance with an embodiment hereof.
Figure 4B:
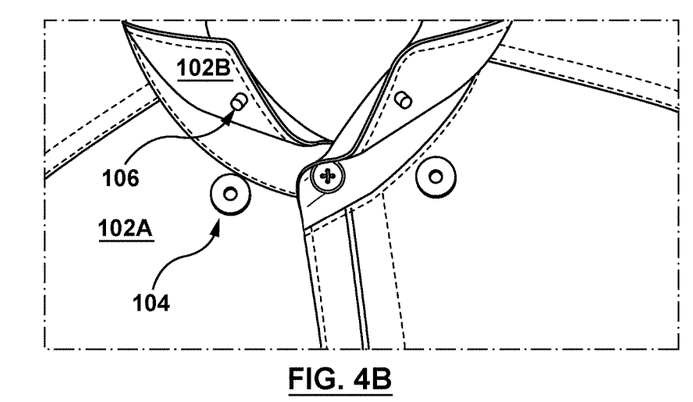

For example, as shown in FIGS. 4A and 4B, coil 104 and magnet associated with structural material pieces 102A and 102B respectively, can be readily integrated into wearable 400, e.g., the collar (102A) and section of shirt directly below the collar (102B). As described herein, upon transmitting activating signal 312 to power supply 110 (not shown in FIGS. 4A-4B) and a haptic feedback between coil 104 and magnet 106 is generated, resulting in actuation of the structural material (i.e., the collar move, vibrates, or "flips up"), providing the haptic feedback to the user, i.e., the wearer of the shirt.

Figure 5:
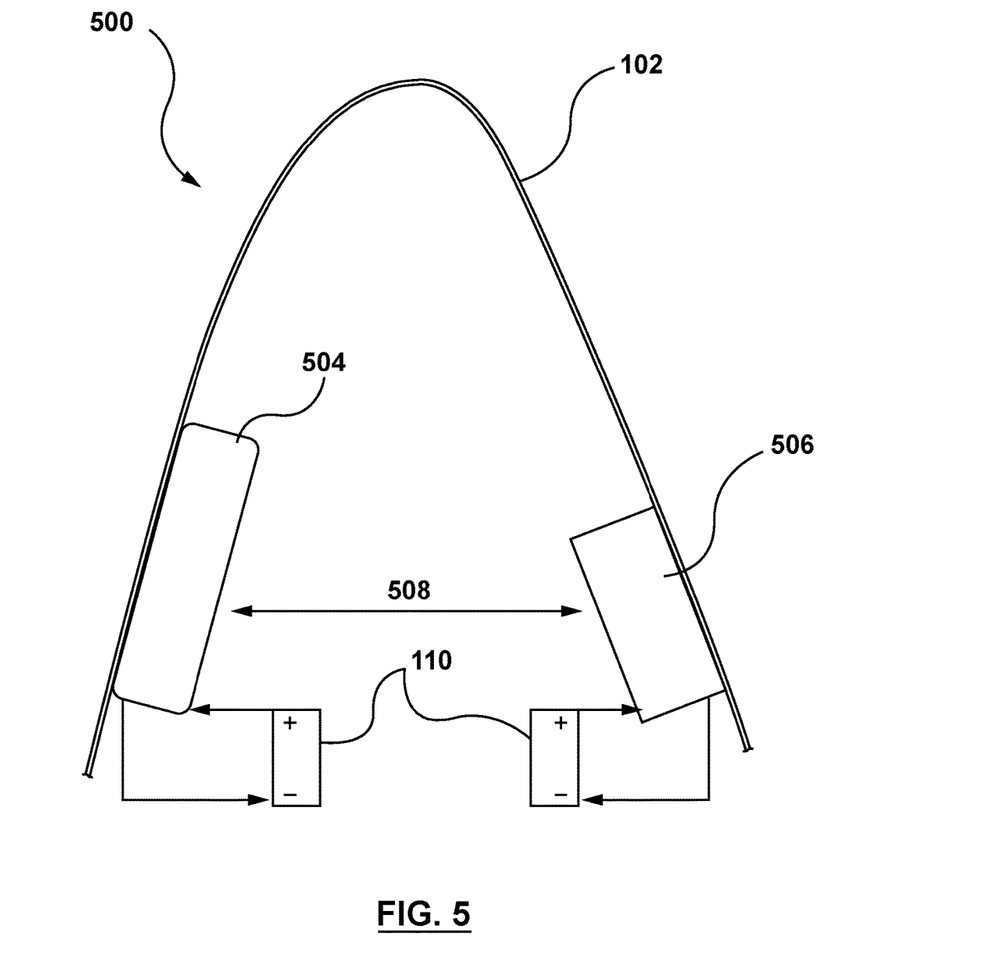
FIG. 5—shows a further smart material for providing haptic feedback in accordance with an embodiment hereof.

In further embodiments, as shown in FIG. 5, also provided herein is a smart material 504 for providing haptic feedback to a user. In exemplary embodiments, smart material 504 includes structural material 102, a first actuator 504 associated with structural material 102, and a second actuator 506 associated with the structural material. In embodiments, as illustrated by 508 in FIG. 5, first actuator 504 and second actuator 506 are oriented in an opposed manner to each other so as to provide the haptic feedback to the user.

Exemplary structural materials 102 for use in smart material 504 are described herein. Also, as described herein, in embodiments, the first actuator and the second actuator are on one of, a single piece of the structural material, attached pieces of the structural material, and separate pieces of the structural material. Furthermore, as described throughout, the first actuator and/or the second actuator can be integrated into the structural material, or the first actuator and/or the second actuator can be fixedly attached to the structural material. In additional embodiments, the first actuator and/or the second actuator can be enclosed in an encapsulating material. Exemplary encapsulating materials are described herein, and include for example, a water-resistant material or polymer.

In embodiments, the first actuator and/or the second actuator can be any one of an electromagnetic motor ERM (eccentric rotating mass), an LRA (linear resonant actuator), an SMA (shape memory alloys, or shape memory material alloy), a macro fiber composite (MFC), a shape memory polymer (SMP), piezoelectric elements, etc.

As shown in FIG. 5, suitably the first and/or second actuator can be connected to power supply 110. While separate power supplies can be used, in additional embodiments, a single power supply can be used to provide power to both actuators.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for integration into a structural material for providing haptic feedback to a user, the system comprising:
   a. a first actuator enclosed in an encapsulating material;
   b. a second actuator enclosed in an encapsulating material;
   c. a power supply connected to the first actuator; and
   d. a controller connected to the first actuator, the second actuator and/or the power supply, so as to generate a first magnetic field from the first actuator, such that the first magnetic field and a second magnetic field of the second actuator are substantially diametrically opposed to each other so as to provide the haptic feedback to the user.

2. The system of claim 1, wherein the encapsulating material comprises a water-resistant material or polymer.

3. The system of claim 1, wherein the controller is connected to the power supply.

4. The system of claim 3, wherein the controller is also connected to the first actuator.

5. The system of claim 4, wherein the controller is connected to the power supply and the first actuator by a wireless connection.

6. The system of claim 3, wherein the controller is connected to the power supply by a wireless connection.

7. The system of claim 1, wherein the controller includes one or more of a bus, a processor, an input/output (I/O) controller, and a memory.

8. The system of claim 1, wherein the controller includes a wireless transceiver which is capable of pairing to a gaming controller, gaming system or gaming console.

9. The system of claim 1, wherein the system is for integration with a virtual reality or augmented reality system.

10. A system for integration into a structural material for providing haptic feedback to a user, the system comprising:
 a. a coil enclosed in an encapsulating material;
 b. a magnet enclosed in an encapsulating material;
 c. a power supply connected to the coil; and
 d. a controller connected to the power supply and/or the coil, so as to generate a first magnetic field from coil, such that the first magnetic field and a magnetic field of the magnet are substantially diametrically opposed to each other so as to provide the haptic feedback to the user.

11. The system of claim 10, wherein the encapsulating material comprises a water-resistant material or polymer.

12. The system of claim 10, wherein the coil comprises copper.

13. The system of claim 10, wherein the coil comprises a conductive fiber.

14. The system of claim 10, wherein the magnet comprises a nanomagnetic material.

15. The system of claim 10, wherein the controller is connected to the power supply and the coil.

16. The system of claim 15, wherein the controller is connected to the power supply and the coil by a wireless connection.

17. The system of claim 10, wherein the controller is connected to the power supply by a wireless connection.

18. The system of claim 10, wherein the controller includes one or more of a bus, a processor, an input/output (I/O) controller, and a memory.

19. The system of claim 10, wherein the controller includes a wireless transceiver which is capable of pairing to a gaming controller, gaming system or gaming console.

20. The system of claim 10, wherein the system is for integration with a virtual reality or augmented reality system.

* * * * *